(12) United States Patent
Agner

(10) Patent No.: US 11,305,631 B2
(45) Date of Patent: Apr. 19, 2022

(54) DRIVE TRAIN UNIT FOR A HYBRID VEHICLE, TRANSMISSION UNIT AND DRIVE TRAIN

(71) Applicant: Schaeffler Technologies AG & Co. KG, Herzogenaurach (DE)

(72) Inventor: Ivo Agner, Bühl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 15/733,922

(22) PCT Filed: May 10, 2019

(86) PCT No.: PCT/DE2019/100422
§ 371 (c)(1),
(2) Date: Dec. 1, 2020

(87) PCT Pub. No.: WO2019/233511
PCT Pub. Date: Dec. 12, 2019

(65) Prior Publication Data
US 2021/0221217 A1 Jul. 22, 2021

(30) Foreign Application Priority Data

Jun. 4, 2018 (DE) .......................... 102018113222.0
Apr. 10, 2019 (DE) ...................... 10 2019 109 429.1

(51) Int. Cl.
*B60K 6/48* (2007.10)
*B60K 6/387* (2007.10)
(Continued)

(52) U.S. Cl.
CPC ................ *B60K 6/48* (2013.01); *B60K 6/387* (2013.01); *B60K 6/405* (2013.01);
(Continued)

(58) Field of Classification Search
None
See application file for complete search history.

(56) References Cited

U.S. PATENT DOCUMENTS 6,666,655 B2 * 12/2003 Heath ..................... F04B 23/08
417/53
7,192,257 B2 * 3/2007 Becker ................ F04B 39/0055
417/79
(Continued)

FOREIGN PATENT DOCUMENTS

DE 10338558 A1 3/2004
DE 102004009832 A1 9/2004
(Continued)

*Primary Examiner* — Dirk Wright

(57) ABSTRACT

A drive train unit for a vehicle includes a housing, an input shaft rotatably mounted in the housing and arranged for rotationally fixed attachment to an output of a transmission, a first clutch operable between a rotor of an electric machine and the input shaft, and a coolant delivery device integrated in the housing. The coolant delivery device is arranged to generate a coolant circuit from the input shaft outwardly in a radial direction when the input shaft is rotated. The coolant delivery device has a discharge element for deflecting coolant flowing in a circumferential direction into a channel inwardly in the radial direction. The drive train unit may include the electric machine with the rotor. The drive train may have an output shaft and a second clutch operable between the input shaft and the output shaft.

12 Claims, 11 Drawing Sheets

(51) Int. Cl.
    *B60K 6/405*        (2007.10)
    *F16D 48/02*        (2006.01)
(52) U.S. Cl.
    CPC ... *B60K 2006/4808* (2013.01); *B60Y 2200/92* (2013.01); *F16D 2048/029* (2013.01)

(56) References Cited

U.S. PATENT DOCUMENTS

| | | | | |
|---|---|---|---|---|
| 8,047,807 | B2* | 11/2011 | Robeck | F16H 61/0025 |
| | | | | 417/87 |
| 9,322,400 | B2* | 4/2016 | Becker | F04B 23/14 |
| 9,770,970 | B2* | 9/2017 | Ruder | H02K 7/108 |
| 2012/0080286 | A1* | 4/2012 | Kasuya | B60K 6/48 |
| | | | | 192/113.3 |
| 2016/0082825 | A1 | 3/2016 | Ruder | |
| 2017/0259662 | A1 | 9/2017 | Meixner | |

FOREIGN PATENT DOCUMENTS

| | | | | |
|---|---|---|---|---|
| DE | 102006040117 A1 | | 3/2008 | |
| DE | 102011005353 A1 * | | 9/2012 | ......... F16H 57/0438 |
| DE | 102012211487 A1 | | 1/2014 | |
| DE | 102015218748 A1 * | | 3/2017 | ............. B60K 6/40 |
| EP | 3012488 A1 * | | 4/2016 | ......... F16H 57/0438 |
| WO | WO-2016067538 A1 * | | 5/2016 | ......... F16H 57/0473 |
| WO | WO-2018181352 A1 * | | 10/2018 | ............... H02K 9/19 |

\* cited by examiner

DRIVE TRAIN UNIT FOR A HYBRID VEHICLE, TRANSMISSION UNIT AND DRIVE TRAIN

CROSS-REFERENCE TO RELATED APPLICATIONS

This application is the United States National Phase of PCT Appln. No. PCT/DE2019/100422 filed May 10, 2019, which claims priority to German Application Nos. DE102018113222.0 filed Jun. 4, 2018 and DE102019109429.1 filed Apr. 10, 2019, the entire disclosures of which are incorporated by reference herein.

TECHNICAL FIELD

The disclosure relates to a drive train unit for a hybrid vehicle, such as a hybrid-powered passenger car, truck, bus or other hybrid-powered commercial vehicle. The disclosure also relates to a transmission unit for a hybrid vehicle, having the drive train unit. The disclosure also relates to a drive train for a hybrid vehicle, having the transmission unit.

BACKGROUND

Automatic transmissions for motor vehicles are generally known from the prior art. So-called P3-E machines are also already known, which are arranged at a transmission output of the automatic transmission and can be coupled and uncoupled by means of a separating clutch.

However, a disadvantage of the designs known from the prior art has been found to be that existing clutches do not allow sufficient torque transmission for all required areas of application.

SUMMARY

The disclosure provides a drive train unit for a vehicle, e.g., a hybrid vehicle, with a housing, an input shaft which is rotatably mounted in the housing and is prepared for rotationally fixed attachment to an output of a transmission, an optional electric machine, a first clutch that can be used between a rotor of the electric machine and the input shaft, and an optional second clutch that can be used between the input shaft and an output shaft. The drive train may include an actuating unit assigned to at least one of the two clutches. In an example embodiment, the drive train includes two actuating units each assigned to one of the two clutches. The drive train also includes a coolant delivery device integrated in the housing and designed in such a way that, when the input shaft rotates, it generates a coolant circuit from the input shaft outwardly in the radial direction to plurality of friction plates of at least one clutch. The coolant delivery device has a discharge element, which facilitates the coolant flowing in the circumferential direction to be deflected into a channel in the radially inward direction.

As a result, a coolant circulation is built up during operation, triggered by the kinetic energy of the rotating clutches, which coolant circulation facilitates an efficient drive train unit. The drive train unit is thus implemented while running wet and is permanently cooled during operation.

The first clutch may be arranged in a first housing region of the housing, the second clutch may be arranged in a second housing region of the housing, and the housing regions may be separated from one another by a (central) housing wall. The housing wall may extend inward in the radial direction up to a support bearing, by means of which support bearing the input shaft is directly mounted on the housing wall. This results in a clever construction of the housing in two coolant circuits that can be supplied independently of one another.

For the coolant discharge, a first bulkhead element may project radially from the outside into the first housing region in such a way that the first housing region is divided into a first subspace accommodating the first clutch and into a second subspace accommodating a first actuating unit. The bulkhead element enables the coolant circuit to be diverted in a targeted manner between the subspaces. This means that the corresponding clutch is cooled more effectively. If two subspaces are provided, the (first) discharge element is arranged in the (first) subspace (of the first housing region) having the clutch.

A second bulkhead element may project radially from the outside into the second housing region in such a way that the second housing region is divided into a first subspace accommodating the second clutch and a second subspace accommodating a second actuating unit. If two subspaces are provided, the (second) discharge element is arranged in the (first) subspace (of the second housing region) having the clutch.

Overall, this results in a first subsystem of the coolant delivery device, which first subsystem generates a first coolant circuit supplying the first clutch. A first discharge element is thereby provided, which generates the first coolant circuit supplying the first clutch. The coolant delivery device may have a second subsystem which generates a second coolant circuit supplying the second clutch. A second discharge element is thereby provided, which generates a second coolant circuit supplying the second clutch. The two subsystems may be controllable/functioning independently of one another.

If the coolant delivery device has at least one jet pump which supports the coolant circuit(s) in at least one operating state, a powerful coolant supply is implemented. For a compact structure, the jet pump may be attached to the housing wall.

The disclosure further relates to a transmission unit for a hybrid vehicle, having the drive train unit according to any one of the embodiments described above and having a transmission connected to the input shaft of the drive train unit.

The disclosure also relates to a drive train for a hybrid vehicle, having the transmission unit and a differential gear coupled to the output shaft of the drive train unit in a rotationally fixed manner. This provides a powerful drive train.

With regard to the drive train, the output shaft of the drive train unit may be connected to a Cardan shaft leading to a differential gear in a rotationally fixed manner. As a result, the drive train unit is integrated directly into an all-wheel drive of the hybrid vehicle.

In other words, according to the disclosure, a hybrid transmission (transmission unit) is made available which has an (automatic) transmission and an electric machine which is axially offset therefrom and is arranged at an output of the transmission. The electric machine can be coupled to/decoupled from a drive train using a separating clutch. In addition, a further (second) clutch can optionally be provided, which is designed for coupling/decoupling a drive shaft (output shaft) connected to a differential gear. The electric machine and the at least one clutch or the two clutches together form a module. An annular fluidic (oil) cooling device is provided to passively cool the clutches.

Kinetic energy of a rotating fluid discharged through the clutches is used to create a coolant circuit.

BRIEF DESCRIPTION OF THE DRAWINGS

The disclosure will now be explained in more detail with reference to figures, in which context various exemplary embodiments are also shown. In the figures.

DETAILED DESCRIPTION

The figures are only schematic in nature and serve only for understanding the invention. The same elements are provided with the same reference symbols. The different features of the various exemplary embodiments can also be freely combined with one another.

Figure 1:
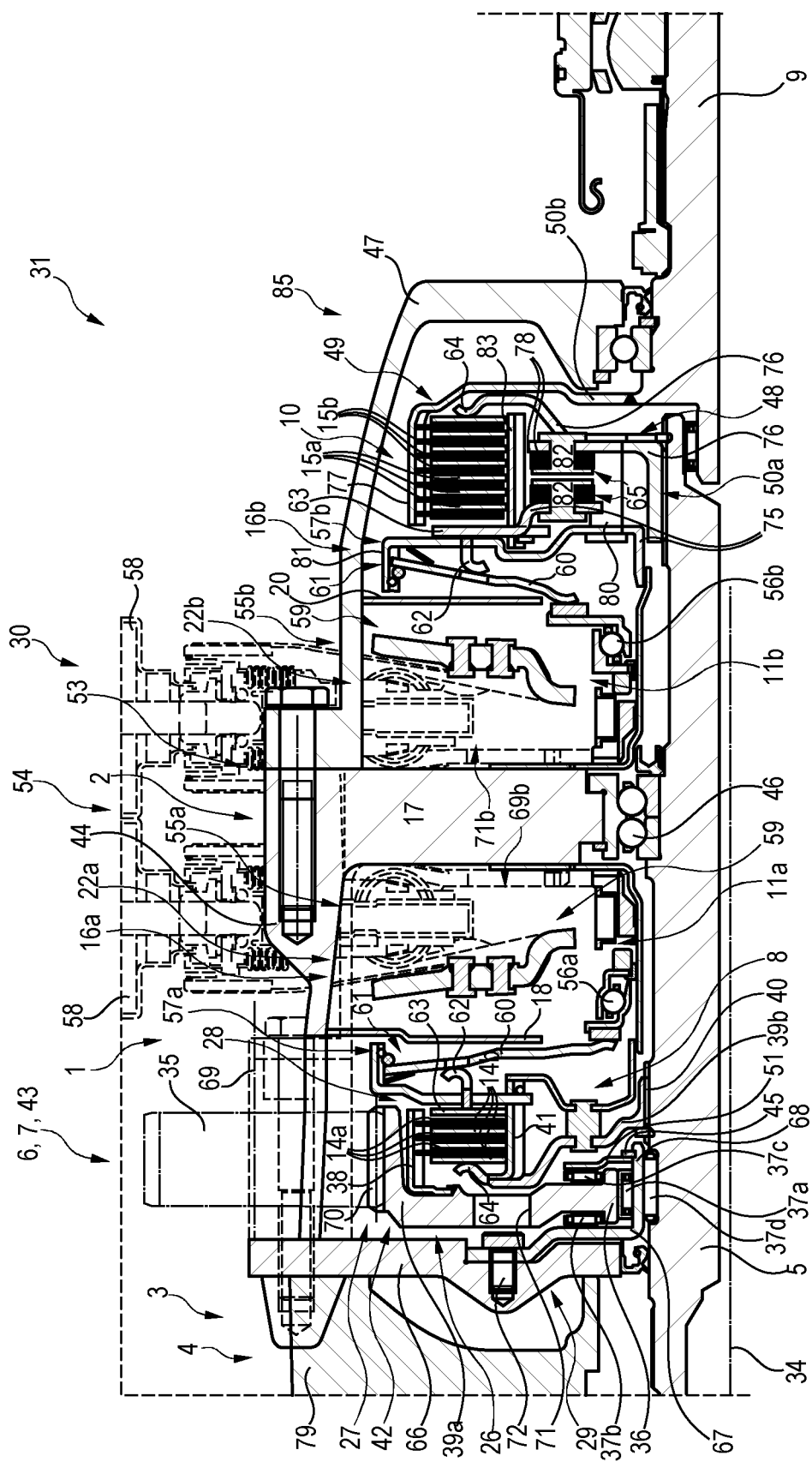
FIG. 1 shows a longitudinal sectional view of a drive train unit according to the disclosure, integrated in a transmission unit, according to a first exemplary embodiment, wherein the drive train unit has two different clutches and, for the sake of clarity, the view of an electric machine is omitted.

FIG. 1 shows a drive train unit 1 according to the disclosure constructed according to a first exemplary embodiment. The drive train unit 1 is already operatively connected to a transmission 4, which is only indicated with regard to its position in FIG. 1 and is further illustrated in FIG. 6. The drive train unit 1 forms a transmission unit 30 with this transmission 4. The transmission 4 is implemented as an automatic transmission. An output 3 (in the form of a transmission output shaft) of the transmission 4 is connected in a rotationally fixed manner to an input shaft 5 of the drive train unit 1. The output 3 may be connected in a rotationally fixed manner to the input shaft 5 via a toothing.

Figure 6:
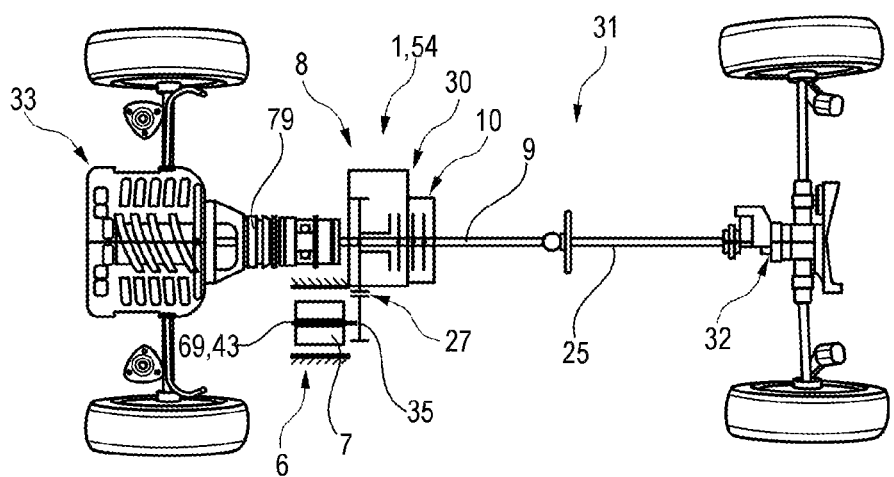
FIG. 6 shows a schematic view of a drive train used in a motor vehicle, in which the drive train unit according to FIG. 1 is used.

The transmission unit 30 may be used in a drive train 31 of a hybrid all-wheel drive vehicle, as can be seen in FIG. 6. The transmission 4 is operatively connected on the input side in a typical manner to an internal combustion engine 33. The drive train unit 1 is inserted between the transmission 4 and a Cardan shaft 25 which is further connected to a differential gear 32 on a rear axle of the motor vehicle. The Cardan shaft 25 is fixed in a rotationally fixed manner to an output shaft 9 of the drive train unit 1. The drive train unit 1 has a clutch device 54 with two clutches 8, 10 and an electric machine 6, which is indicated in principle with regard to its position.

Returning to FIG. 1, it can also be seen that the drive train unit 1 has a housing 2 which substantially forms two housing regions 16a, 16b separated from one another by a housing wall 17/partition wall. In a first housing region 16a of the housing 2, a first clutch 8, which is referred to below as a separating clutch 8, is housed radially outside the centrally arranged input shaft 5, the axis of rotation/longitudinal axis of which is has the reference sign 34. The separating clutch 8 is implemented as a friction plate clutch. The input shaft 5 is supported on a radial inside of the housing wall 17 by a support bearing 46, designed here as a double ball bearing/double-row groove ball bearing.

The separating clutch 8 is rotatably coupled with its first clutch component 26 to a rotor 7 of the electric machine 6. The first clutch component 26 has a plurality of first friction plates 14a, which are typically connected to a plurality of second friction plates 14b of the second clutch component 28 of the separating clutch 8 in a rotationally fixed manner (closed position) or are rotationally decoupled therefrom (open position) for the embodiment as a friction plate clutch. The first and second friction plates 14a, 14b are alternately arranged in the axial direction. The separating clutch 8 is moved back and forth between its closed position and its open position by a first actuating unit 11a. The friction plates 14a, 14b are to be understood as units having a friction lining on a support element either on one side or on both sides.

As explained in more detail below, the first actuating unit 11a is equipped with a (first) axial force actuator in the form of a first lever actuator 55a, which has an adjusting effect on a first actuating bearing 56a. The first actuating bearing 56a in turn serves to shift the first and second friction plates 14a, 14b. The first lever actuator 55a, and the second lever actuator 55b described below, are each implemented in a known manner. In this connection, reference is made by way of example to the release system of DE 10 2004 009 832 A1, the structure and function of which is considered to be integrated therein for the respective lever actuator 55a, 55b.

Accordingly, the respective lever actuator 55a, 55b has an electric motor 58 which, for example, interacts with a ramp element to adjust it via a spindle drive. The ramp element is axially adjustable by means of a pivot point which can be moved along its radial ramp contour and which can be adjusted by the spindle drive. Due to the axial coupling of the ramp element to the actuating bearing 56a, 56b, the respective actuating bearing 56a, 56b is displaced and the corresponding clutch is actuated. In a further embodiment, the respective axial force actuator is alternatively implemented as a hinge actuator. In this connection, reference is made to DE 10 2012 211 487 A1, which describes such a hinge actuator, the design of which is considered to be integrated therein for the respective axial force actuator. Accordingly, in the further embodiment, the first axial force actuator is implemented as a first hinge actuator and/or the second axial force actuator is implemented as a second hinge actuator.

The first clutch component 26 also has a (first) carrier 39a which is rotatably mounted relative to the housing 2, namely to a bearing flange unit 29 connected to the housing 2 and forming the housing 2 therewith, which is referred to simply as the bearing flange 29 in the following. For this purpose, the first carrier 39a has a bearing base 36 on its radial inside, which is supported on the bearing flange 29 via a plurality of roller bearings 37a, 37b, 37c in the axial direction and in the radial direction. From this bearing base 36, the first carrier 39a extends radially outwards in a substantially disk-shaped manner with respect to the axis of rotation 34. On a radial outer side, the first carrier 39a forms a toothing 70 (external toothing) which is coupled in a rotationally fixed manner with the rotor 7, as described in more detail below.

A (first) receiving region 38 projecting in the axial direction is provided radially inside the toothing 70 on the first carrier 39a, which first receiving region 38 serves directly to receive the first friction plates 14a in a rotationally fixed manner. The receiving region 38 is also part of the first clutch component 26. In addition, the first friction plates 14a are received on the first receiving region 38 such that they can be displaced relative to one another in the axial direction. The first friction plates 14a are arranged towards a radial inside of the first receiving region 38, so that the first carrier 39a forms an outer plate carrier of the separating clutch 8. The first carrier 39a extends in such a way that the first friction plates 14a are arranged in the radial direction outside the bearing base 36 and radially inside the toothing 70.

The second clutch component 28 is permanently coupled to the input shaft 5 in a rotationally fixed manner. For this purpose the second clutch component 28 has a (second) carrier 39b. The second carrier 39b is connected to the input shaft 5 via a serration 40 in a rotationally fixed manner. The second carrier 39b has a first sleeve region 41 which extends in the axial direction and to the radial outer side of which the second friction plates 14b are arranged in a rotationally fixed manner and displaceable relative to one another in the axial direction. The second carrier 39b thus forms an inner plate carrier of the separating clutch 8.

In this embodiment, the electric machine 6 with its rotor 7, which in turn can be rotated about a rotor axis of rotation 69, is arranged radially outside the input shaft 5. A rotor shaft 43 (FIG. 6) of the rotor 7 is arranged radially offset, here substantially parallel to the axis of rotation 34. To couple the rotor 7 to the first carrier 39a, a gear stage 27 is provided. A gearwheel 35, shown in dashed lines in FIG. 1, is permanently in meshing engagement with the toothing 70. The gearwheel 35 is directly connected to the rotor shaft 43 (FIG. 6) in a rotationally fixed manner and is thus arranged coaxially to the rotor 7. If the separating clutch 8 is in an open position, it is possible to let the electric machine 6/the rotor 7 stand still. In a closed position of the separating clutch 8, the electric machine 6 can typically be operated. In further embodiments, instead of the gear stage 27, a coupling of the rotor 7 via a continuous traction mechanism, such as a belt or chain, is provided with the toothing 70 which is then correspondingly adapted to the continuous traction mechanism.

With regard to the bearing flange 29, which supports the first carrier 39a, it can also be seen that it is substantially implemented in two parts, wherein a one-part design according to further embodiments is also possible. A disk-shaped base body 66 of the bearing flange 29 is further connected to a main housing component 44 of the housing 2 that forms the housing wall 17. In this embodiment, the base body 66, like the main housing component 44, is made of an aluminum material (a cast aluminum material) and itself forms a crank.

A support element 67 of the bearing flange 29 is connected to the base body 66. The support element 67 is fastened to the base body 66 (in the region of its crank) via a plurality of fastening means 72, here screws, which are distributed in the circumferential direction. For easier attachment of the fastening means 72, axial through holes 71 are made in the first carrier 39a at the radial height of the fastening means 72. Each of these through holes 71 is axially aligned with fastening means 72 in an initial position/assembly position. The support element 67 may be made from a formed steel material. The support element 67 has a bearing region 68 which forms a crank.

The bearing region 68 constitutes an axial projection on which the first carrier 39a is supported radially from the outside. The first carrier 39a is mounted on the bearing region 68 via a first roller bearing 37a serving as a radial bearing. On a side of the first carrier 39a facing the base body 66 in the axial direction, a second roller bearing 37b is arranged between the support element 67 and the first carrier 39a, forming an axial bearing. A third roller bearing 37c, which also forms an axial bearing, is arranged on a side of the first carrier 39a axially facing away from the base body 66. This third roller bearing 37c is arranged in the axial direction between the first carrier 39a and a shim 51 in the form of a shim disk, which is received on the support element 67 in an axially fixed manner. The shim 51 is fixed directly to the bearing region 68 by means of a securing ring 45. The input shaft 5 is mounted radially from the inside on the bearing region 68 via a fourth roller bearing 37d relative to the housing 2. With regard to the first to fourth roller bearings 37a to 37d, it should be pointed out that although these are implemented as needle bearings in this embodiment, in other embodiments they can also be implemented in other ways, for example as ball bearings.

The housing wall 17 divides the housing 2 into the first housing region 16a and the second housing region 16b. The second housing region 16b is delimited by a secondary housing component 47 which forms an overhead cavity and which is fastened to the main housing component 44. A further, second clutch 10 is arranged in the second housing region 16b. The second clutch 10, which is simply referred to as a clutch in the following, is also implemented as a friction clutch, namely a friction plate clutch. For example, as explained in more detail below, this clutch 10 is implemented as a self-intensifying clutch 10. A first clutch component 48 of the clutch 10 is connected to the input shaft 5 in a rotationally fixed manner. A second clutch component 49 of the clutch 10 is connected in a non-rotationally fixed manner to the output shaft 9, which output shaft 9, as already described, is further connected to the Cardan shaft 25.

The first clutch component 48 of the clutch 10 has a first carrier 50a (of the clutch 10) as well as a plurality of first friction plates 15a (of the clutch 10), which are axially displaceable relative to one another and received on the first carrier 50a in a rotationally fixed manner. The first friction plates 15a alternate in the axial direction with second friction plates 15b of the second clutch component 49 of the clutch 10. The second friction plates 15b are in turn mounted on a second carrier 50b (of the clutch 10) in a rotationally fixed manner and axially displaceable relative to one another. The second carrier 50b is directly connected to the output shaft 9 (here via a weld). To adjust the clutch 10 between its open position and its closed position, a second actuating unit 11b is provided in the second housing region 16b.

The second actuating unit 11b is, as explained in more detail below, equipped with a (second) axial force actuator in the form of a second lever actuator 55b, which has an adjusting effect on a second actuating bearing 56b. The second actuating bearing 56b in turn serves to move the first and second friction plates 15a, 15b.

Figure 17:
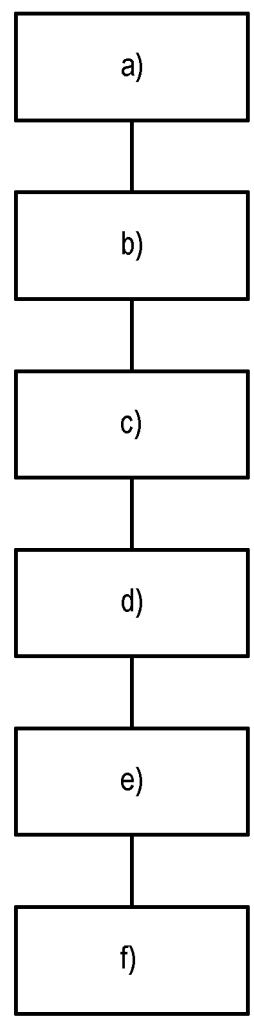
FIG. 17 shows a schematic view to illustrate an assembly method of the drive train unit according to FIG. 1.

In connection with FIGS. 1 and 17, reference should also be made to an example method of assembling the drive train unit 1 or the transmission unit 30. In a first step a), the bearing flange 29 is attached to the transmission housing, namely screwed to this transmission housing 79. In this first step a), the electric machine 6 is also attached to the transmission housing.

In a second step b), a first module 42 is provided. The bearing flange 29 together with the first carrier 39a of the separating clutch 8 mounted thereon forms the common first module 42. The first carrier 39a is mounted together with the first to third roller bearings 37a, 37b, 37c on the support element 67 fastened to the base body 66. In addition, in the second step b), the rotor 7 of the electric machine 6 is connected to the first carrier 39a of the separating clutch 8 via the gear stage 27. The gear stage 27, i.e., the gearwheel 35 including its bearing and the electric machine 6 are already pre-assembled in step a). In addition, the axial play of the first carrier 39a of the separating clutch 8 is adjusted by means of the shim 51. It should be noted that, according to a further embodiment, the first module 42 is first installed separately (according to step b)) and then attached (according to step a)) to the transmission housing 79 by fastening the bearing flange 29.

In a third step c), the central input shaft 5 is mounted via the support bearing 46 on the radially inwardly projecting housing wall 17. The support bearing 46 is consequently preloaded between the main housing component 44 and the input shaft 5. The support bearing 46 is thus firmly fixed between the housing 2 and the input shaft 5. In this third step c), the main housing component 44 is still spaced apart/disassembled from the bearing flange 29 and the other components of the housing 2. The input shaft 5 is also arranged separately from the separating clutch 8.

In a fourth step d), a first lever actuator 55a (first axial force actuator) of the first actuating unit 11a provided for actuating the separating clutch 8 is mounted in the main housing component 44, namely in the first housing region 16a. In this fourth step d), a second lever actuator 55b (second axial force actuator) provided for actuating the second clutch 10 is also mounted in the main housing component 44, namely in the second housing region 16b. This results in an assembly in which the second lever actuator 55b is attached on an axial side of the housing wall 17 facing away from the first lever actuator 55a.

In a fifth step e), the second clutch component 28 of the separating clutch 8 is attached to the input shaft 5 in a rotationally fixed manner. A second module 53 is thus created.

Furthermore, the first clutch component 48 of the second clutch 10 is connected to the input shaft 5 in a rotationally fixed manner. This may also be done in step e). To implement a third module 85, the secondary housing component 47 connected to part of the second clutch component 49 of the second clutch 10 is also provided. The third module 85 is fastened to the main housing component 44, and the second clutch 10 with its two clutch components 48, 49 that can be coupled to one another fully assembled and the second lever actuator 55b is brought into operative connection with this second clutch 10. With the second clutch component 49 of the second clutch 10, the output shaft 9 is already connected in a rotationally fixed manner in this step.

In a sixth step f), a second module 53 provided by steps c) to e) is connected as a whole to the first module 42 so that the main housing component 44 is connected to the bearing flange 29, the separating clutch 8 with its two clutch components 26, 28 that can be coupled to one another is fully assembled, and the first lever actuator 55a is brought into operative connection with the separating clutch 8. Finally, the drive train unit 1 is mounted on the transmission housing 79. The individual method steps a) to f) may be carried out one after the other in alphabetical order. After step f), the third module 85 may then be attached to the second module 53.

In this connection, it should be pointed out that the various modules 42, 53, 85 can be mounted independently of one another in any order. It is also possible to provide only two of the three modules 42, 53, 85 and connect them to one another.

Figure 3:
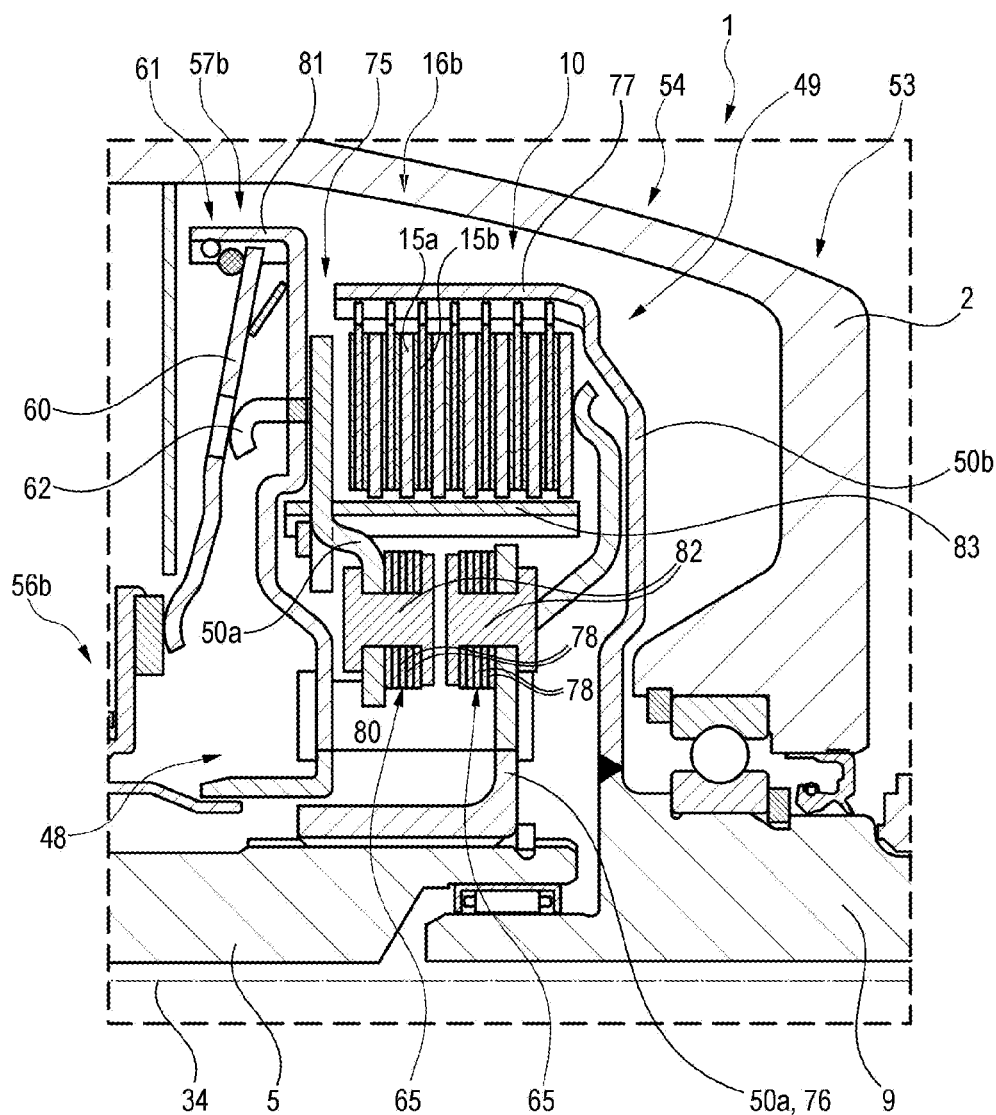
FIG. 3 shows a detailed longitudinal sectional view of the drive train unit according to FIG. 1 in the region of a self-intensifying, further clutch provided in addition to the separating clutch.
Figure 4:
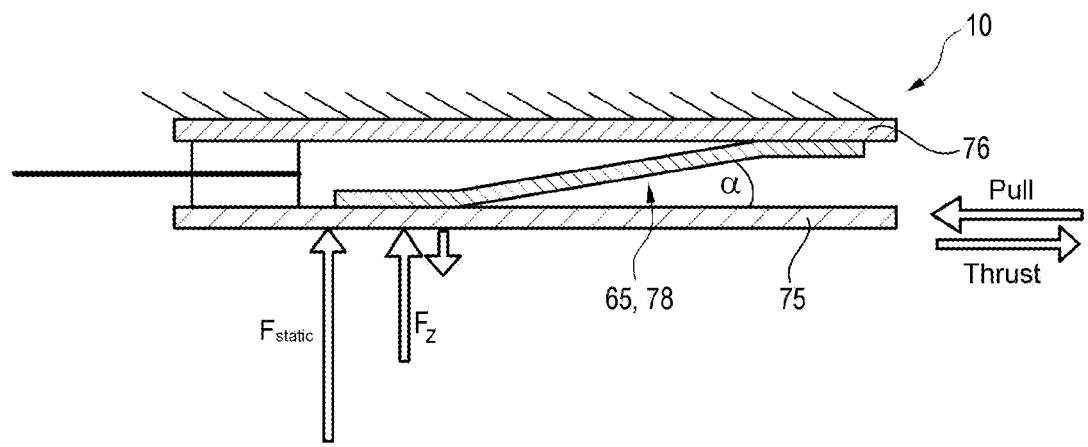
FIG. 4 shows a schematic representation of a peripheral region of the further clutch according to FIG. 3, in which region a leaf spring unit can be seen which has a certain set angle when the further clutch is closed.
Figure 5:
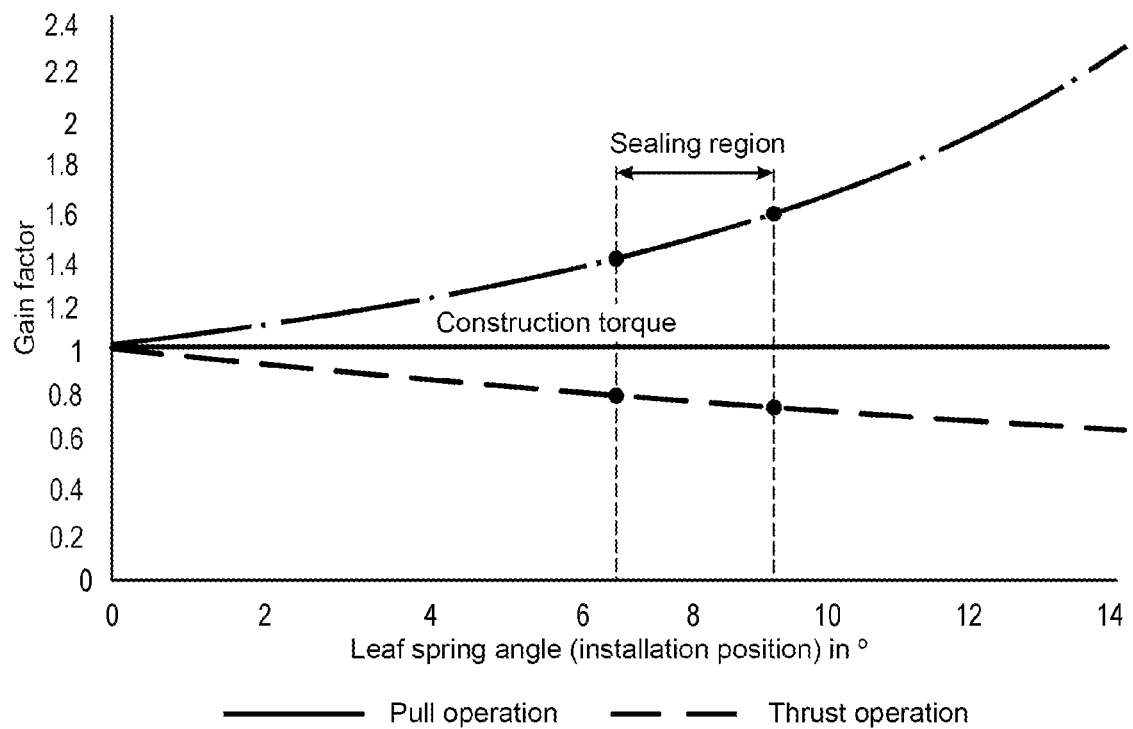
FIG. 5 shows a diagram to illustrate a relationship between a gain factor and the set angle of the leaf springs of the leaf spring unit (leaf spring angle) of the further clutch according to FIG. 3.
Figure 7:
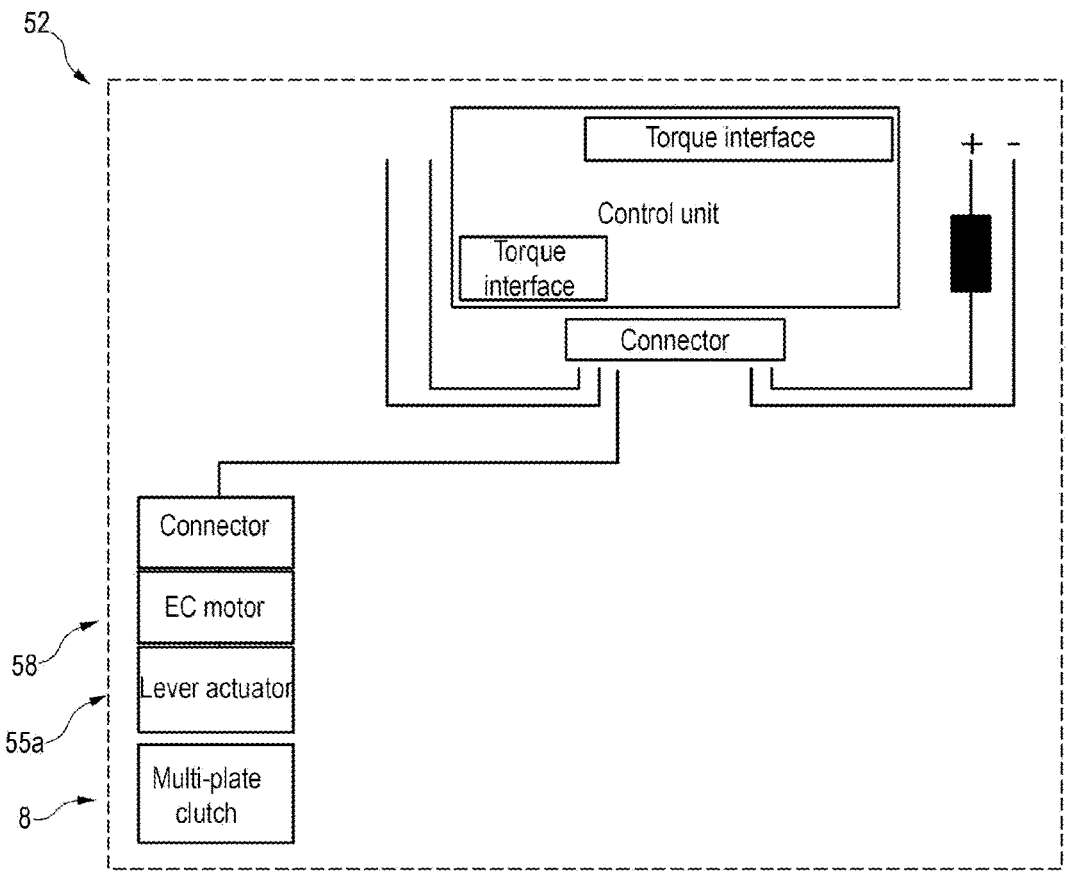
FIG. 7 shows a schematic representation of a control system that can be used to control the separating clutch.
Figure 8:
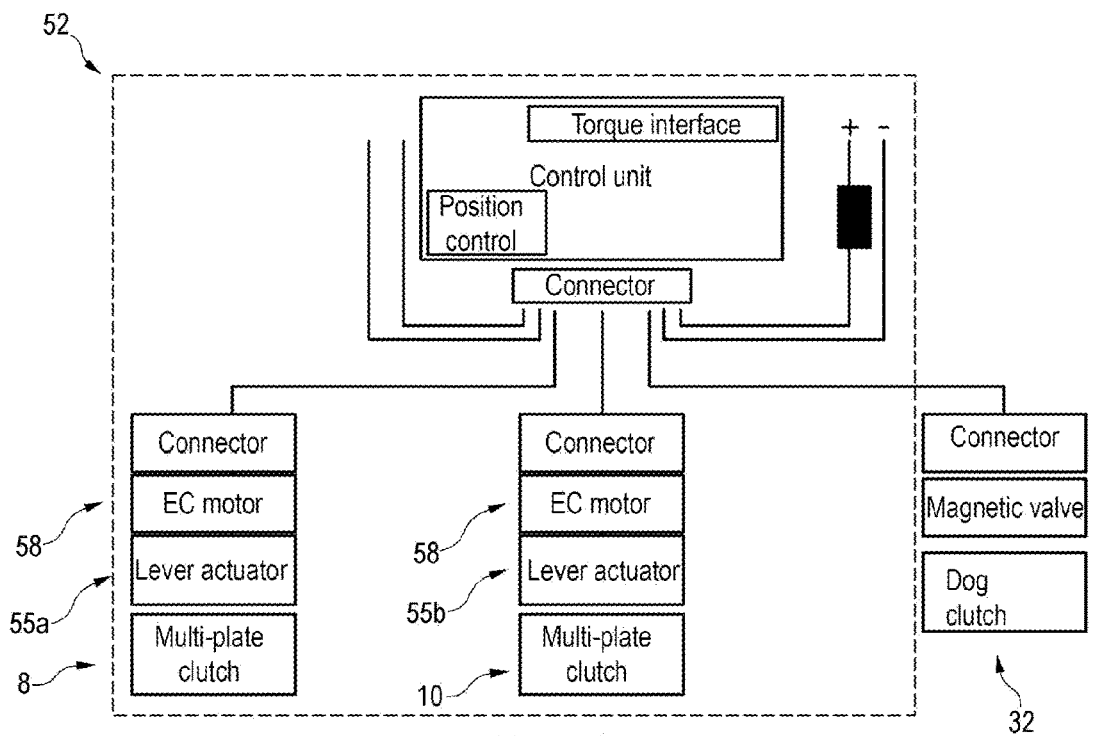
FIG. 8 shows a schematic representation of a control system that can be used to control the two clutches of the drive train unit according to FIG. 1.
Figure 9:
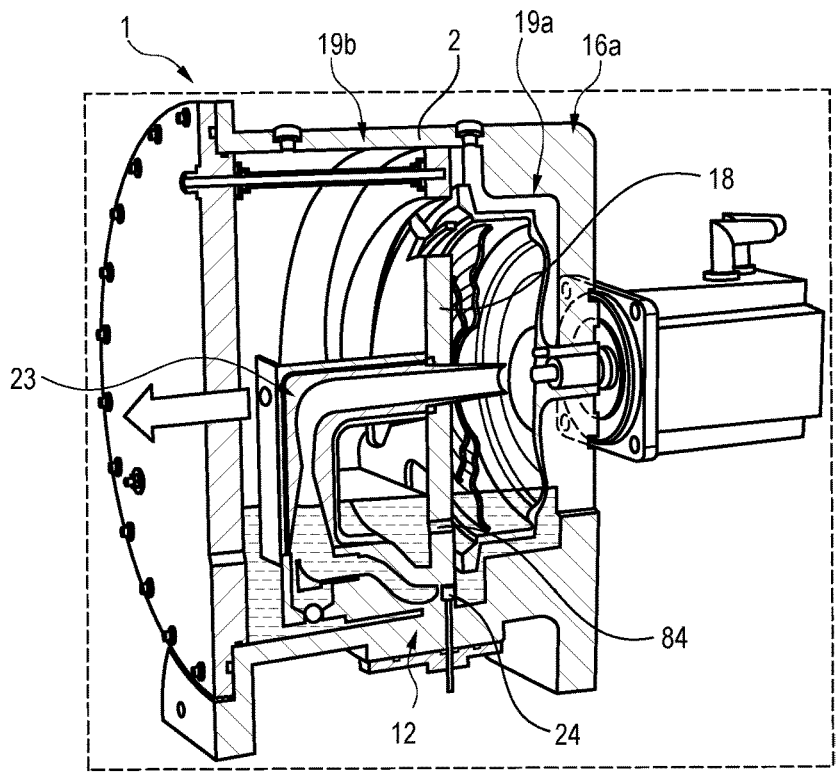
FIG. 9 shows a perspective longitudinal sectional view of a drive train unit according to a third exemplary embodiment in a standing state, wherein the drive train unit is implemented while running wet and has a coolant delivery device.

FIGS. 3 to 5 further describe the self-intensifying structure of the second clutch 10, which is described in detail below. FIGS. 7 and 8 also illustrate control systems 52 which can be implemented in principle and which are designed to control the drive train unit 1. FIG. 7 shows the control system 52 only on the side of a region that interacts with the separating clutch 8. In FIG. 8, the entire control system 52 is also shown with a region, which control system controls the second clutch 10 and the differential gear 32 designed as a rear axle gear.

Figure 2:
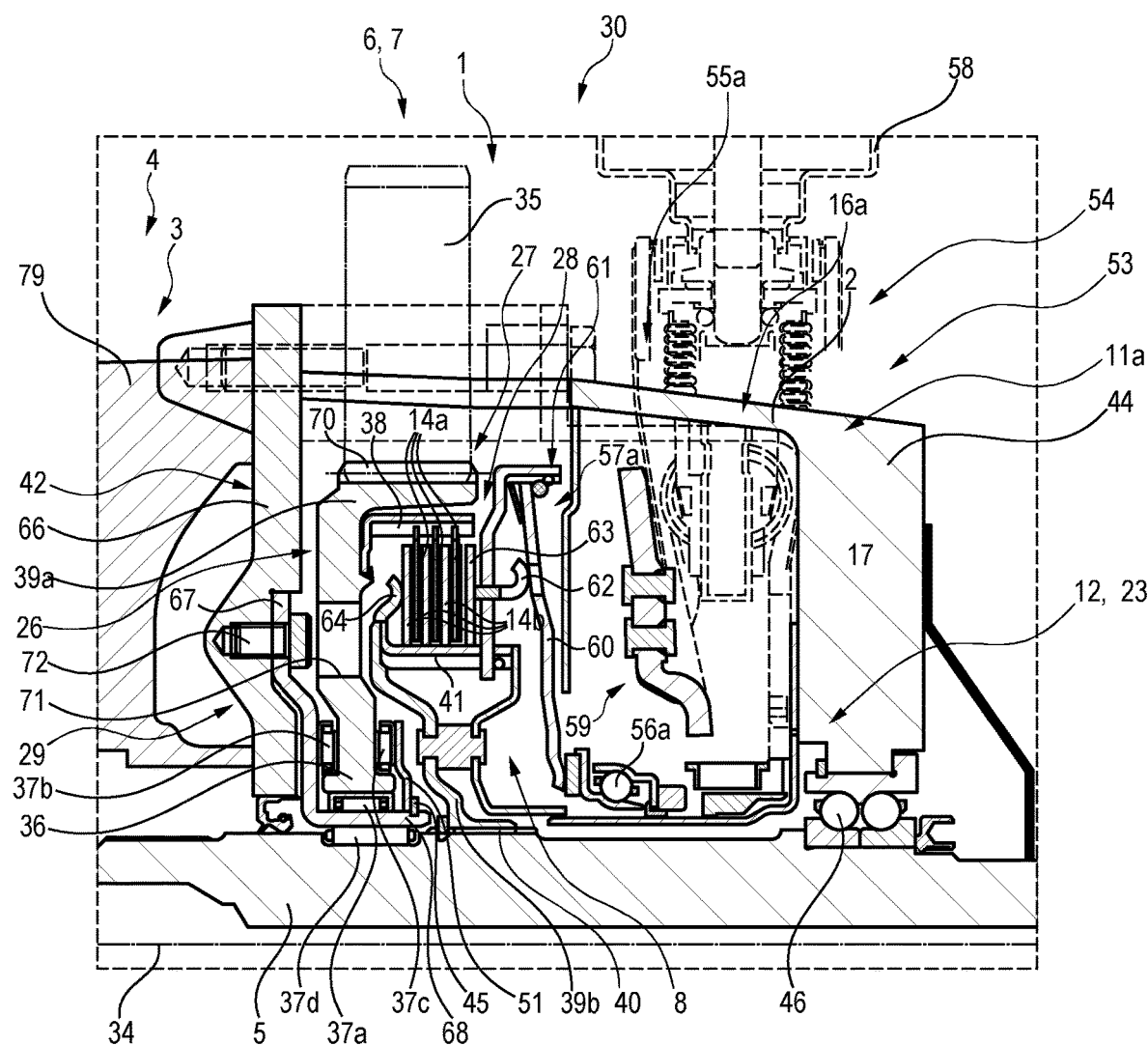
FIG. 2 shows a longitudinal sectional view of a drive train unit according to the disclosure, designed for a front-wheel drive of a motor vehicle, according to a second exemplary embodiment, wherein the drive train unit is only provided with one single separating clutch.

In connection with FIG. 2, a second exemplary embodiment of the drive train unit 1 is illustrated, corresponding in structure and function to the first exemplary embodiment. The drive train unit 1 of this second exemplary embodiment is implemented like the first exemplary embodiment with regard to the first housing region 16a and the components accommodated by this first housing region 16*a*. In this connection, it should be pointed out that, in principle, the optional second clutch 10 is also dispensed with in order to provide a hybrid transmission unit 30, e.g., purely for front-wheel drive. In this embodiment, the drive train unit 1 therefore only has the function of coupling and uncoupling the electric machine 6 from the front wheels of the motor vehicle. The assembly takes place according to the method described above, wherein the partial steps relating to the second clutch 10 are omitted.

With regard to a further aspect of the disclosure, let us return to FIG. 1. As can be seen in FIG. 1, both the first clutch 8 and the second clutch 10 have an actuating unit 11*a*, 11*b* assigned thereto. The first actuating unit 11*a* acting on the first clutch 8 is accommodated together with the first clutch 8 in the first housing region 16*a*. The first actuating unit 11*a* and the first clutch 8 are arranged on a first axial side of the central housing wall 17. The second clutch 10 and the second actuating unit 11*b* acting on it are arranged on a second axial side of the housing wall 17 facing away from this first axial side. It should be pointed out that the two actuating units 11*a*, 11*b* are in principle arranged in a mirror-inverted manner to the housing wall 17, but are substantially constructed in the same way and function in the same way. The function of the two actuating units 11*a*, 11*b* is thus described below using the first actuating unit 11*a* as an example, wherein this function is also applicable to the second actuating unit 11*b*.

The first actuating unit 11*a* has the first lever actuator 55*a*, which is partially shown in FIG. 1. As already mentioned, the first lever actuator 55*a* is constructed according to the release system of DE 10 2004 009 832 A1. It can also be seen that the first actuating bearing 56*a*, which is implemented here as a ball bearing, also acts on a first actuating force introduction mechanism 57*a*, which is also received on the first carrier 39*a* of the first clutch 8 and acts in an adjusting manner on the friction plates 14*a*, 14*b*. In this way, an actuating force/axial force can be applied to the entirety of friction plates 14*a*, 14*b* in the axial direction and the first clutch 8 can be brought into its closed position.

To support the actuating force, the first actuating force introduction mechanism 57*a* is received directly on the first carrier 39*a*, which is also directly connected to the input shaft 5, in such a way that the actuating force is introduced directly into the input shaft 5 via the first carrier 39*a* and from there via the central support bearing 46 is passed on to the housing wall 17/is supported relative thereto.

The first actuating force introduction mechanism 57*a* has a lever element 60 implemented, for example, as a plate spring. The lever element 60 is pivotably received on a pivot bearing 61 which is fixedly connected to the first carrier 39*a*. Radially within the pivot bearing 61, the lever element 60 acts in an adjusting manner on an actuator 62 which forms a pressure pot and which in turn acts directly in a shifting manner on the entirety of the friction plates 14*a*, 14*b*. Alternatively, the first actuating force introduction mechanism 57*a* can also be implemented only with the actuator 62 and consequently the first actuating bearing 56*a* can act directly on the actuator 62 in an adjusting manner.

On a side of the set of friction plates 14*a*, 14*b* axially facing away from the actuator 62, a counter-support region 64 is arranged. The counter support region 64 is also directly connected to the first carrier 16 in order to achieve a closed force curve in the first carrier 16 and the actuating force to be introduced into the input shaft 5 via the first carrier 16.

As already mentioned, the second actuating unit 11*b* is constructed and functioning in accordance with the first operating unit 11*a*. Accordingly, the second actuating unit 11*b* in turn serves to apply force to the entirety of the friction plates 15*a*, 15*b* of the second clutch 10 by means of a second actuating force introduction mechanism 57*b*. It can be seen here that, due to the self-intensifying design of the second clutch 10, a first carrier part 75 of the first carrier 50*a* of the second clutch 10, which accommodates the second actuating force introduction mechanism 57*b*, with a second carrier part 76, attached directly to the input shaft 5, via several leaf spring units 65 consisting of a plurality of leaf springs 78. The counter support region 64 of the second clutch 10 is coupled directly to the second carrier part 76.

The present aspect is illustrated in FIGS. 9 to 16 in more detail. FIGS. 9 to 16 illustrate two further exemplary embodiments of the drive train unit 1, which exemplary embodiments, however, are in principle constructed and function according to the first and second exemplary embodiments. For the sake of brevity, only the differences between these exemplary embodiments are explained below.

The drive train unit 1 according to FIGS. 9 to 14 is substantially constructed according to the second exemplary embodiment in FIG. 2. The drive train unit 1 of the third exemplary embodiment now additionally has a coolant delivery device 12, which is illustrated in its basic structure. The coolant delivery device 12 is shown in the fourth exemplary embodiment of FIGS. 15 and 16 just once for the two clutches 8, 10, since the coolant delivery devices 12 function identically. The function and structure of the coolant delivery devices 12 of FIGS. 15 and 16 are thus explained below on the coolant delivery device 12 of FIGS. 9 to 14.

The coolant delivery device 12 has a jet pump 23 which can be readily seen in FIGS. 9 to 14, and is arranged in part in a hydraulic fluid sump which is located in the installation position in a lower half of the housing 2. The coolant delivery device 12 is designed in such a way that it generates or supports a first coolant circuit 13*a* by means of the jet pump 23 when the input shaft 5 rotates in the first housing region 16*a*. The first housing region 16*a* which accommodates the separating clutch 8 and the first actuating unit 11*a* is acted upon by/flows from the first coolant circuit 13*a* during operation. A first bulkhead element 18 protrudes into the first housing region 16*a* in such a way that it divides it into two subspaces 19*a*, 19*b*. The first bulkhead element 18, which is implemented as a bulkhead plate, generates a flow through the hydraulic medium accommodated in a second subspace 19*b* accommodating the first actuating unit 11*a*. The first coolant circuit 13*a* is consequently directed to a first subspace 19*a* which receives the separating clutch 8.

Figure 10:
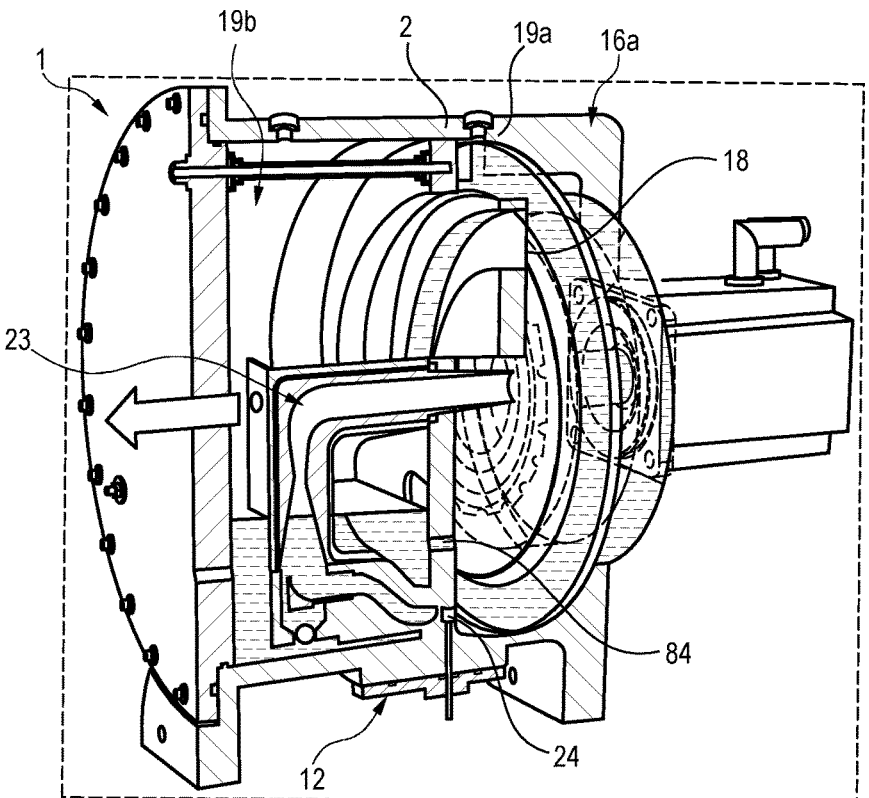
FIG. 10 shows a perspective longitudinal sectional view of the drive train unit according to FIG. 9, wherein the input shaft is now moved at a certain speed so that a certain amount of coolant is already in the rotating region of the drive train unit.
Figure 11:
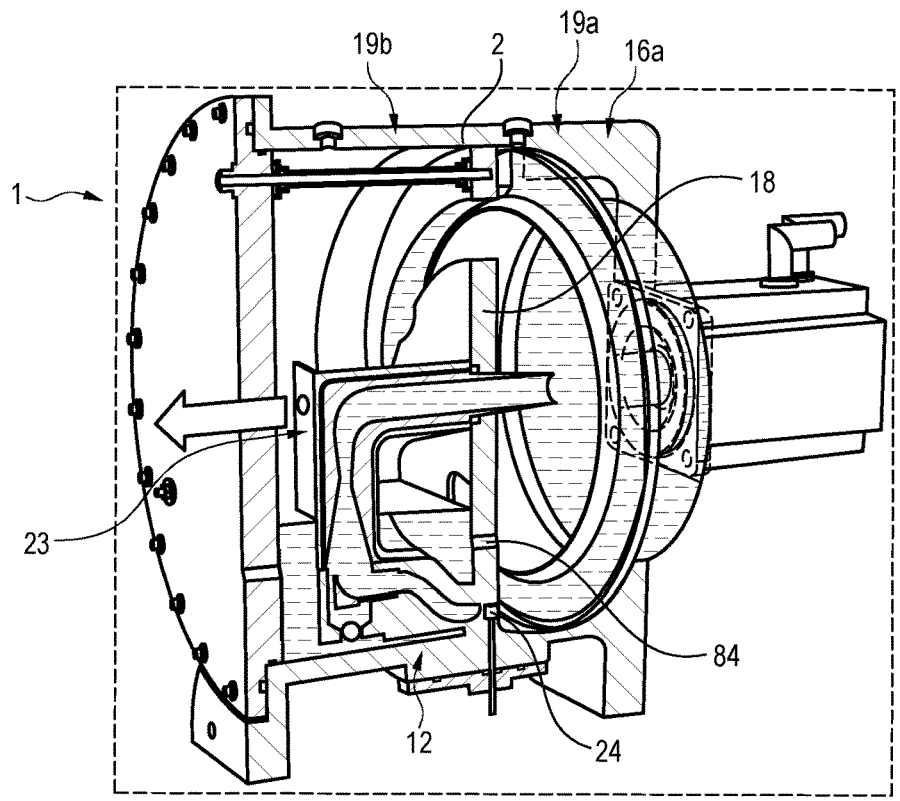
FIG. 11 shows a perspective longitudinal sectional view of the drive train unit according to FIG. 9, wherein a plate for diverting the hydraulic medium is now slightly opened so that a higher proportion of coolant compared to FIG. 10 is built up in the rotating part of the drive train unit.
Figure 12:
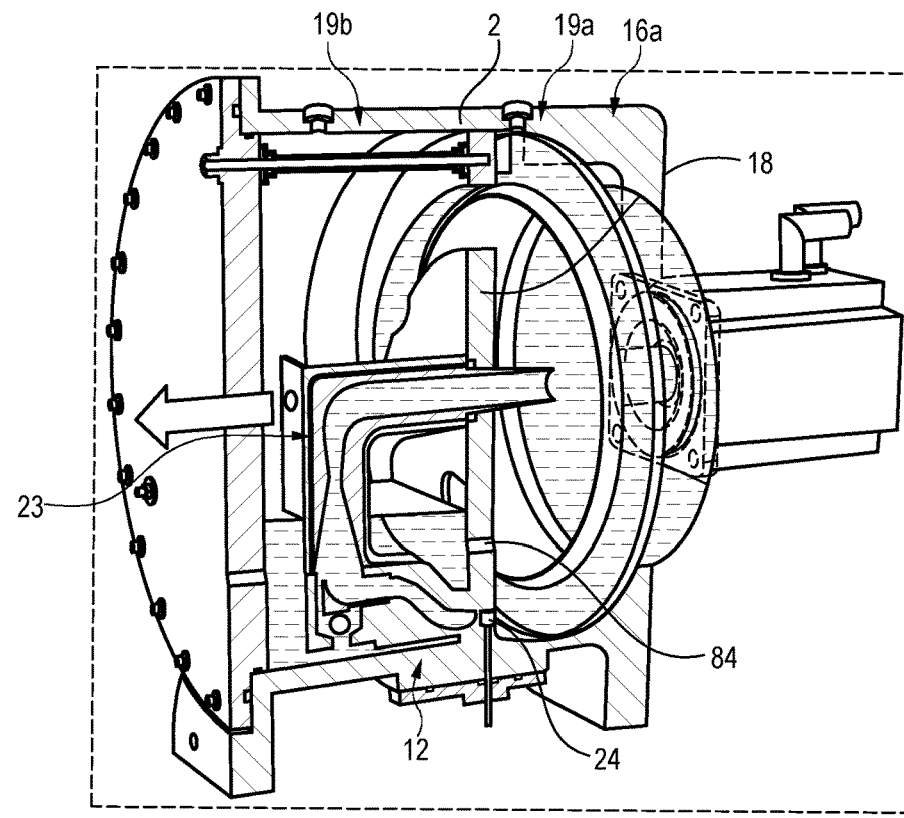
FIG. 12 shows a perspective longitudinal sectional view of the drive train unit according to FIG. 9 with a completely open flap, so that, compared to FIG. 11, further hydraulic medium is conveyed into the rotating part of the drive train unit.
Figure 13:
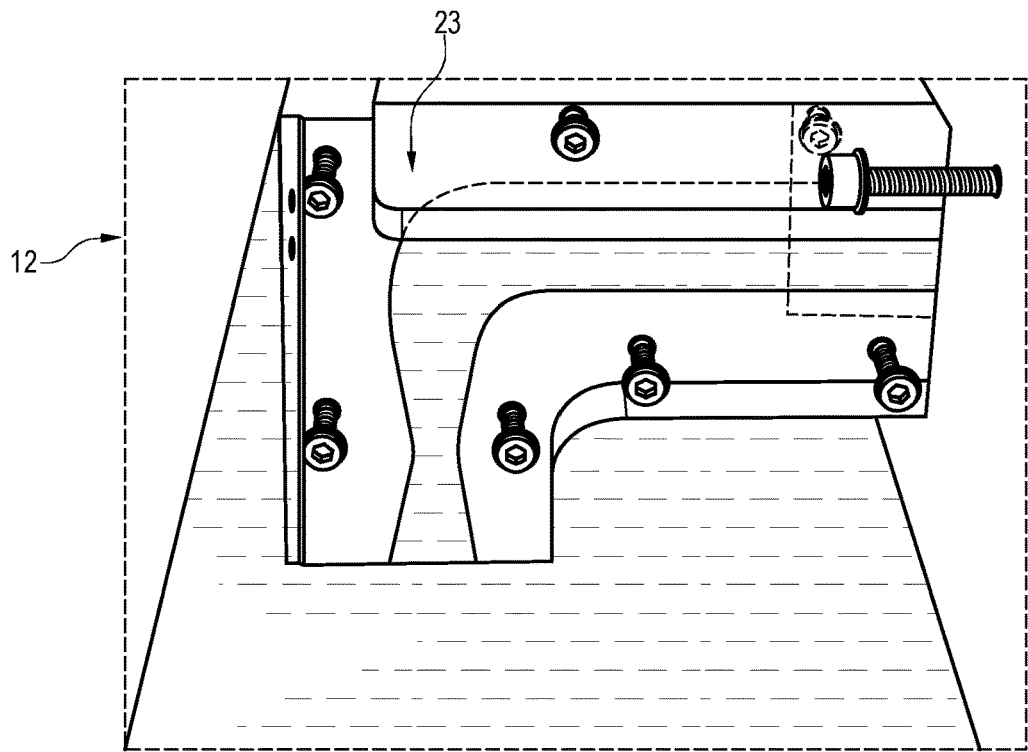
FIG. 13 is a perspective view of a longitudinal cut-away of the jet pump used in the coolant delivery device of FIGS. 9 to 12, wherein the hydraulic medium has a minimum level.
Figure 14:
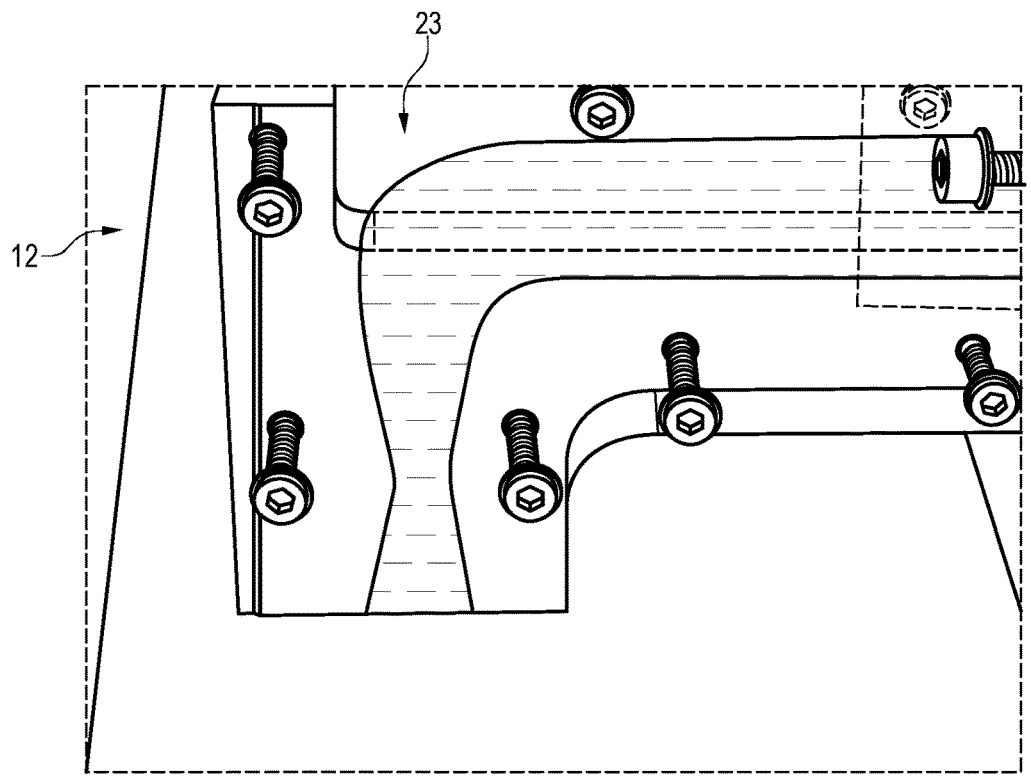
FIG. 14 shows a perspective view of a longitudinal cut-away of the region of the jet pump of FIG. 13, wherein a maximum level for conveying the hydraulic medium is now achieved.

Furthermore, as shown in FIGS. 10 to 12, a valve element 24 is additionally arranged in the coolant delivery device 12, which allows a flow regulation of the coolant in the first coolant circuit 13*a* with the input shaft 5 rotating. One or more openings 84 are also provided on the housing wall 17 in order to compensate for a level of the hydraulic medium in the subspaces 19*a*, 19*b*.

Figure 15:
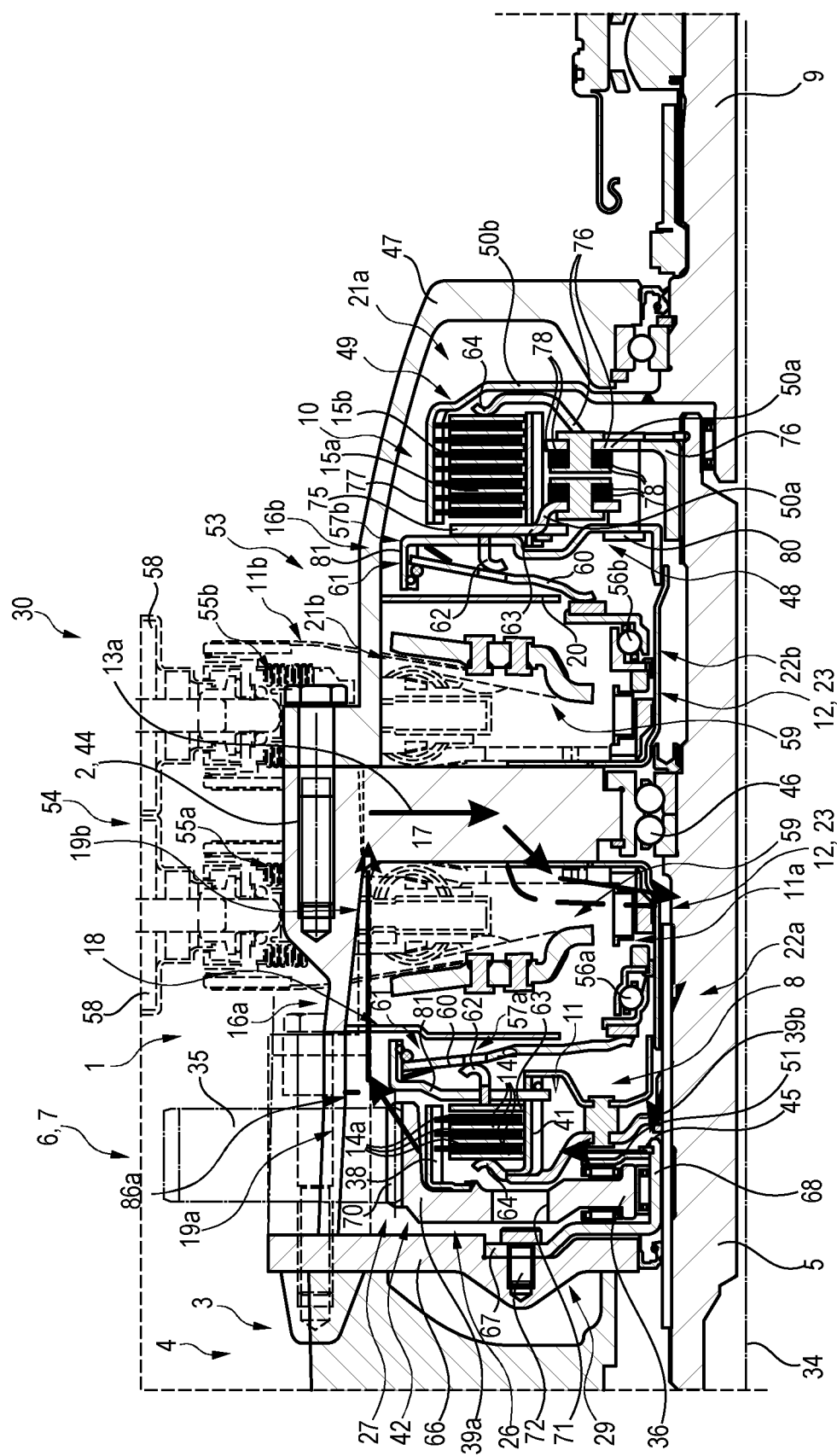
FIG. 15 shows a longitudinal cut-away view of a drive train unit according to a fourth exemplary embodiment, wherein a coolant delivery device is also provided and a hydraulic medium flow built up by the separating clutch is shown.
Figure 16:
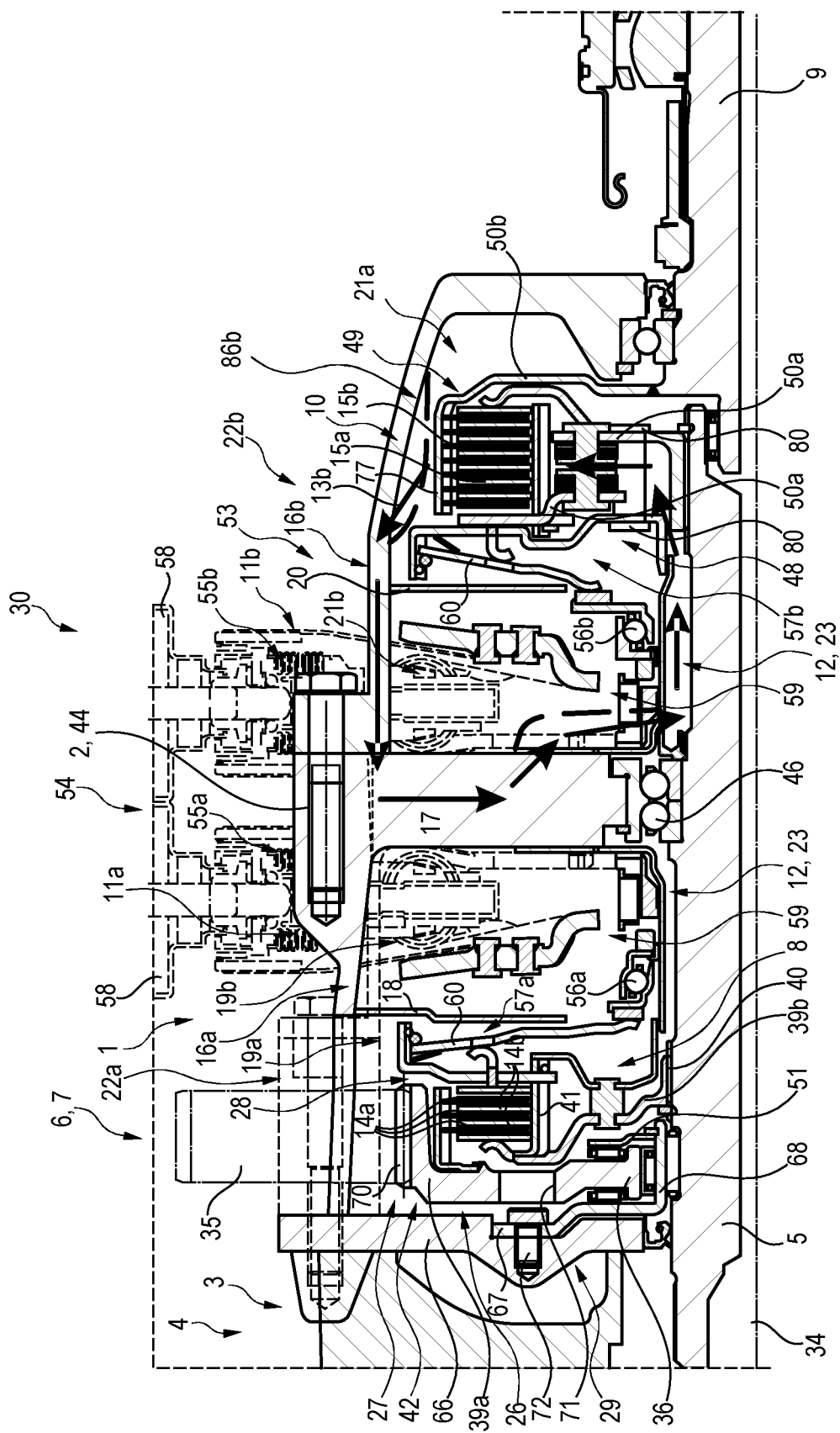
FIG. 16 shows a longitudinal cut-away view of the drive train unit according to FIG. 15, wherein a hydraulic medium flow built up by the further clutch during operation is now shown.

The coolant delivery devices 12 of FIGS. 15 and 16 are designed in such a way that they each generate a coolant circuit 13*a*, 13*b* both in the first housing region 16*a* and in the second housing region 16*b* with the input shaft 5 rotating and thus the clutches 8, 10 rotating. The jet pump(s) 23 is/are then at least partially attached/integrated on the housing wall 17.

As likewise shown in FIGS. 15 and 16, the respective coolant delivery device 12 has a schematically illustrated discharge element 86*a*, 86*b*. The discharge element 86*a*, 86*b* is designed in such a way that it enables the coolant flowing in the circumferential direction to be deflected into a channel in the radially inward direction. The discharge element 86*a* has, for example, a blade contour. The channel is implemented, for example, by a bore and initially runs axially to the housing wall 17 and from there inward in the radial direction to the input shaft 5. A first discharge element 86*a* is accommodated in the first subspace 19*a*.

The second housing region 16*b* is divided in the same way as the first housing region 16*a*. For this purpose, a second bulkhead element 20 (also designed as a bulkhead plate) is provided, which divides the second housing region 16*b* into two subspaces 21*a*, 21*b*. According to FIG. 16, this also enables a fluid flow through a second subspace 21*b*, which accommodates the second actuating unit 11*b*, into a first subspace 71*a*. The second coolant circuit 13*b* arises in the first subspace 21*a*, which flows around the friction plates 15*a*, 15*b* of the second clutch 10 in the radial direction and thus cools during operation. A valve element 24, which enables the flow of the coolant in the coolant circuits 13*a*, 13*b* to be regulated, is arranged for each clutch 8, 10. A second discharge element 86*b* is accommodated in the first subspace 21*a*.

As a result, a total of two independently controllable hydraulic subsystems 22*a*, 22*b*, each with a coolant delivery device 12 or, alternatively, a coolant delivery device 12 are made available, each of which makes the corresponding coolant circuit 13*a*, 13*b* controllable by the respective clutch 8, 10. This allows effective cooling of the respective clutch 8, 10.

According to a further aspect of the disclosure, as shown in FIGS. 1 and 3 and in connection with FIGS. 4 and 5, the second clutch 10 implemented as a friction clutch, which in further embodiments is also to be regarded as a unit detached from the first clutch 8 and the electric machine 6, is implemented as a self-intensifying clutch. This second clutch 10 according to the disclosure has the first clutch component 48 equipped with the two-part (first) carrier 50*a*. The first carrier part 75 of this first carrier 50*a* is that component which directly receives the plurality of first friction plates 15*a* in a rotationally fixed manner and axial displacement relative to one another. For this purpose, the first carrier part 75 typically has a sleeve-shaped (second) receiving region 83, on the radial outside of which the first friction plates 15*a* are attached. The first carrier part 75 also has a pressing plate 63 which is displaceable in the axial direction and which has an adjusting effect at the end on the ensemble of the friction plates 15*a*, 15*b* of the second clutch 10. The pressing plate 63 is formed here by a plate element which is received separately on the second receiving region 83, but in further embodiments can in principle also be formed as one of the friction plates 15*a*, 15*b*.

The second carrier part 76 is connected to the first carrier part 75, which second carrier part 76 is that part of the first carrier 50*a* which is attached directly (by means of a serration) to the input shaft 5. The second carrier part 76 forms a counter-support region 64 on an axial side of the ensemble of friction plates 15*a*, 15*b* facing away from the pressing plate 63. The counter support region 64 serves to directly support an axial force/actuating force which compresses the friction plates 15*a*, 15*b* in a closed position of the second clutch 10. In the closed position, the actuating force is typically introduced via the second actuating force introduction mechanism 57*b* to the entirety of the friction plates 15*a*, 15*b* (via the pressing plate 63).

The second actuating force introduction mechanism 57*b* is fixed to the second carrier part 76. A plurality of stud bolts 80 distributed in the circumferential direction are used to fix a bearing section 81 of the second actuating force introduction mechanism 57*b* formed from a separate sheet metal to the second carrier part 76 or to design it as a component of this second carrier part 76. The lever element 60 is pivotably mounted on the mounting section 81. The lever element 60 is implemented, for example, as a plate spring. A second actuating bearing 56*b* acts on the lever element 60 and, in turn, the second lever actuator 55*b* of the second actuating unit 11*b* acts on this second actuating bearing 56*b*.

A plurality of leaf spring units 65 are provided distributed between the two carrier parts 75, 76 along a circumference of an imaginary circular line running around the central axis of rotation 34. Each leaf spring unit 65 has a plurality of leaf springs 78, here five by way of example, which are arranged to form a leaf spring assembly. Accordingly, the leaf springs 78 within a leaf spring unit 65 are formed substantially identically and lie flat on one another. Each leaf spring 78 of the leaf spring unit 65, as can be seen particularly well in connection with FIG. 4, is provided with a set angle α.

The set angle α is selected so that in the closed position of the second clutch 10, a torque transmitted by the clutch 10 in a driving direction of rotation (pull) increases the axial force/actuating force of the second clutch 10 in a self-intensifying manner. Accordingly, the force $F_z$ is also applied in order to increase the existing axial actuating force F. In the case of a direction of rotation (thrust) opposite to this drive direction of rotation, however, the axial force is reduced by a corresponding amount. As can also be seen in connection with FIG. 5, the gain factor increases in principle with an increasing set angle α of the respective leaf spring 78. It becomes clear here that the set angle α may be selected between 6° and 10°, e.g., between 6.5° and 9.5°. This represents a suitable compromise between an increase in the axial force and a stability of the leaf springs 78.

In FIG. 3, two of the leaf spring units 65 can be seen in section. A first leaf spring unit 65 on the side of its first end fixed to the first carrier part 75 (via a rivet 82) and a second leaf spring unit 65 on the side of its, on the second carrier part 76 (via a rivet 82) fixed second end can be seen.

The second carrier 50*b* also has a second sleeve region 77, on the radial inside of which the plurality of second friction plates 15*b* are received in a rotationally fixed manner and are axially displaceable relative to one another.

In other words, according to the disclosure an automatic transmission 30 is provided with a P3 electric machine 6 arranged at the transmission output 3, which can be connected and disconnected by means of a separating clutch 8 and optionally an all-wheel clutch 10 (so-called Quattro clutch) for connecting and disconnecting the Cardan shaft 25, which leads to the distribution gear 32. The system thus hybridizes the transmission 4, which can implement the classic hybrid functions (electric driving, braking and thrust energy recovery, sailing, boost) using an electric machine 6 with a separating clutch 8 and an all-wheel drive clutch 10, which, if required, can shift the Cardan shaft 25. The system is arranged in a modular way so that the hybridization can be installed in both front-wheel drive and all-wheel drive (with or without Quattro unit), i.e., the all-wheel drive clutch can also be omitted in front-wheel drive applications.

For reasons of installation space, the electric machine 6 can be connected axially parallel to the drive train 31 and the separating clutch 8 via a gear stage 27. The separating clutch 8 is located in the power flow after the gear stage 27 and before the drive train 31. As a result, the gear losses and bearing drag torque losses are avoided when the separating clutch 8 is open. An integrated passive transfer mechanism 12 including bulkhead element 18, 20 prevents the clutches 8, 10 from splashing in the oil sump and realizes the clutch cooling. Both clutches 8, 10 are actuated by a mechanical actuator 55a, 55b, which are mounted on a central housing wall 17. The separating clutch 8 is thus operated from the rear and the Quattro clutch 10 from the front. This enables modularization in a simple manner.

According to the disclosure, passive oil cooling in the form of an annular oil cooler 12 is provided for both clutches 8, 10. This uses the kinetic energy of the rotating oil emerging from the clutch 8, 10 to generate cooling oil circulation. A bulkhead plate 18, 20 is attached to the housing 2 and forms a partition wall between the clutch chamber (first subspace 19a, 21a), in which the clutch 8, 10 rotates, and the oil chamber (second subspace 19b, 21b), in which the actuators (actuating units 11a, 11b) are arranged.

A jet pump 23 ensures a permanent exchange of the circulating oil with the oil sump. To get the principle working, openings 84 are provided on the partition wall 17, which equalize the oil level in the two chambers. When the clutch 8, 10 begins to rotate, the oil is pumped to the outside. A large part of the oil finds its way to the channel of the jet pump 23 and the excess, so that the clutch 8, 10 is not under oil, is scooped back into the oil sump through additional openings 84 on the partition wall 27.

REFERENCE NUMERALS

1 Drive train unit
2 Housing
3 Output
4 Transmission
5 Input shaft
6 Electric machine
7 Rotor
8 First clutch/separating clutch
9 Output shaft
10 Second clutch
11a First actuating unit
11b Second actuating unit
12 Coolant delivery device
13a First coolant circuit
13b Second coolant circuit
14a First friction plate of the first clutch
14b Second friction plate of the first clutch
15a First friction plate of the second clutch
15b Second friction plate of the second clutch
16a First housing region
16b Second housing region
17 Housing wall
18 First bulkhead element
19a First subspace of the first housing region
19b Second subspace of the first housing region
20 Second bulkhead element
21a First subspace of the second housing region
21b Second subspace of the second housing region
22a First subsystem
22b Second subsystem
23 Jet pump
24 Valve element
25 Cardan shaft
26 First clutch component of the first clutch
27 Gear stage
28 Second clutch component of the first clutch
29 Bearing flange
30 Transmission unit
31 Drive train
32 Differential gear
33 Internal combustion engine
34 Axis of rotation
35 Gearwheel
36 Bearing pedestal
37a First roller bearing
37b Second roller bearing
37c Third roller bearing
37d Fourth roller bearing
38 First receiving region
39a First carrier of the first clutch
39b Second carrier of the first clutch
40 Serration
41 First sleeve region
42 First module
43 Rotor shaft
44 Main housing component
45 Securing ring
46 Support bearing
47 Secondary housing component
48 First clutch component of the second clutch
49 Second clutch component of the second clutch
50a First carrier of the second clutch
50b Second carrier of the second clutch
51 Shim
52 Control system
53 Second module
54 Clutch device
55a First lever actuator
55b Second lever actuator
56a First actuating bearing
56b Second actuating bearing
57a First actuating force introduction mechanism
57b Second actuating force introduction mechanism
58 Electric motor
59 Lever mechanism
60 Lever element
61 Pivot bearing
62 Actuating member
63 Pressing plate
64 Counter support region
65 Leaf spring unit
66 Base body
67 Support element
68 Bearing region
69 Rotor rotational axis
70 Toothing
71 Through hole
72 Fastening means
75 First carrier part
76 Second carrier part
77 Second sleeve region
78 Leaf spring
79 Transmission housing
80 Stud bolt
81 Bearing section
82 Rivet
83 Second receiving region
84 Opening
85 Third module
86a First discharge element
86b Second discharge element

The invention claimed is:
1. A drive train unit for a vehicle, comprising:
a housing comprising:
a first housing region;
a second housing region; and a housing wall separating the first housing region from the second housing region;
an input shaft rotatably mounted in the housing and arranged for rotationally fixed attachment to an output of a transmission;
a first clutch operable between a rotor of an electric machine and the input shaft; and
a coolant delivery device integrated in the housing;
an output shaft; and
a second clutch operable between the input shaft and the output shaft, wherein:
the coolant delivery device is arranged to generate a coolant circuit from the input shaft outwardly in a radial direction when the input shaft is rotated;
the coolant delivery device comprises a discharge element for deflecting coolant flowing in a circumferential direction into a channel inwardly in the radial direction;
the first clutch is arranged in the first housing region; and
the second clutch is arranged in the second housing region.

2. The drive train unit of claim 1, further comprising the electric machine comprising the rotor.

3. The drive train unit of claim 1, wherein:
the first clutch comprises a plurality of first friction plates; and
the coolant circuit extends outwardly in the radial direction to the plurality of first friction plates.

4. The drive train unit of claim 1, wherein:
the second clutch comprises a plurality of second friction plates; and
the coolant circuit extends outwardly in the radial direction to the plurality of second friction plates.

5. The drive train unit of claim 1 further comprising a first actuating unit, wherein:
the housing comprises:
an outside; and
a first bulk-head element projecting radially from the outside into the first housing region to divide the first housing region into:
a first subspace accommodating the first clutch; and
a second subspace accommodating the first actuating unit.

6. The drive train unit of claim 1 further comprising a second actuating unit, wherein:
the housing comprises:
an outside; and
a second bulk-head element projecting radially from the outside into the second housing region to divide the second housing region into:
a third subspace accommodating the second clutch; and
a fourth subspace accommodating the second actuating unit.

7. The drive train unit of claim 1, wherein the discharge element is a first discharge element that generates the coolant circuit to supply the first clutch.

8. The drive train unit of claim 1, wherein the discharge element is a second discharge element that generates the coolant circuit to supply the first clutch.

9. The drive train unit of claim 1, wherein the coolant delivery device comprises a jet pump arranged to support the coolant circuit in an operating state.

10. The drive train unit of claim 1, wherein:
the coolant delivery device comprises a jet pump arranged to support the coolant circuit in an operating state; and
the jet pump is attached to the housing wall.

11. A transmission unit for a hybrid vehicle, comprising:
the drive train unit of claim 1; and
the transmission connected to the input shaft.

12. A drive train for a hybrid vehicle, comprising:
the transmission unit of claim 11; and
a differential gear coupled to the output shaft in a rotationally fixed manner.

* * * * *